United States Patent Office 3,507,648
Patented Apr. 21, 1970

3,507,648
2(5H)-FURANONE DYES AS SENSITIZERS FOR ORGANIC PHOTOCONDUCTORS
John A. Ford, Jr., and Charles V. Wilson, Rochester, N.Y., assignors to Eastman Kodak Company, Rochester, N.Y., a corporation of New Jersey
No Drawing. Filed June 6, 1966, Ser. No. 555,240
Int. Cl. G03g 5/06; C07d 5/14
U.S. Cl. 96—1.6     6 Claims

ABSTRACT OF THE DISCLOSURE

Electrophotographic elements are described which comprise an organic photoconductor and from 0.5–5% by weight of the photoconductor of a 2(5H)-furanone dye. The dyes have the following formula:

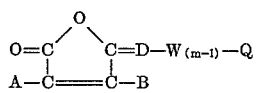

wherein A represents —CN or p-nitrophenyl, B is an alkyl group or an aryl radical, D represents CH—, CH(—CH=CH)$_n$,

a nitrogen atom, a hydrazinylylidene radical or an aralkylidene radical, W represents =CH—, Q represents an aryl radical, a heterocyclic radical, M represents 1 or 2, and $n$ represents 1 or 2.

---

This invention relates to novel dyes resulting from reacting a 2(5H)-furanone with a dye former.

It is recognized that dyes which are useful for dyeing synthetic fibers and which absorb unexpectedly long wave lengths of light are of value. Also it is recognized that dyes which act as sensitizing dyes for organic photoconductors in electrophotography are of value.

Therefore, it is an object of our invention to provide dyes for synthetic fibers which absorb unexpectedly long wave lengths of light. Another object of our invention is to provide dyes useful for sensitizing organic photoconductors in electrophotography. A further object of our invention is to provide a series of dyes having the ability to dye textiles a wide range of colors over substantially the entire range of the spectrum. Other objects of our invention will appear herein.

We have found a new class of dyes which are effective as textile dyes and as sensitizers for organic photoconductors, which dyes correspond to the following formula:

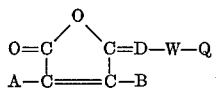

wherein:

A is —CN,

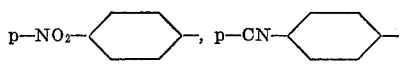

or

R being an amino, substituted amino, alkoxy, aralkoxy, alkyl, aryl or heterocyclic substituent;

B is an aryl, alkyl, aralkyl, alkaryl, or H substituent;
D is a methylidene radical (=CH—), a polymethine chain of 1–5 carbon atoms, a p-phenylene methylidene radical, a nitrogen atom (=N—), a hydrazinylylidene radical, an alkylidene radical or an aralkylidene radical;
W is either a bond or a methylidene radical; and
Q is alkyl, aryl, a heterocyclic ring or a heterocyclylidene radical.

The dyes of our invention are prepared by reacting a 2(5H)-furanone with a dye forming compound characterized in that it will react with an active methylene group to produce a conjugated system of atoms attached to and including the residual carbon from the methylene group. Some compounds useful in forming dyes in accordance with our invention are aldehydes, diazonium compounds, ortho esters, p-nitrosoanilines, ketones, pseudothioketones, intermediate oxidation states of p-phenylenediamine, anilinovinyl derivatives of active methyl compounds and the like.

The 2(5H)-furanones may be conveniently prepared by reacting a halocarbonyl compound such as alpha-haloacetophenone with an alkali metal salt of cyanoacetic acid, described in detail in our copending application filed of even date, whereby a 3-cyano-2(5H)-furanone is obtained. If some other furanone such as a 3-nitro-2(5H)-furanone or 3-nitrophenyl-2(5H)-furanone is desired, the salt of nitroacetic acid or of nitrophenyl acetic acid may be employed as the reagent to react with the halocarbonyl compound in making the corresponding furanone.

As an example of the wide variety of dye colors obtainable in the dyes in accordance with the invention, the following illustrates the colors which are obtained by reacting 3-cyano-4-bromophenyl 2(5H)-furanone (I) with various compounds.

(A) I+benzene diazonium chloride→orange dye
(B) I+benzaldehyde→yellow dye
(C) I+dimethyl nitrosoaniline→magenta dye
(D) I+triethyl orthoformate and tertiary amine (pyridine)→blue dye
(E) I+1,3,3-trimethoxy propene→cyan dye
(F) I+dialkylamine benzene diazonium Cl→blue dye
(G) I+p-dimethylamino benzaldehyde→red dye.

In some cases it is desirable to use instead of the furanones referred to as the intermediate in making the dye, a compound having the formula:

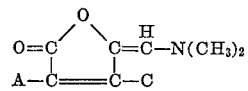

wherein A and B may be the substituents listed supra in connection with the previous structural formula. These intermediates may be readily prepared by reacting a 2(5H)-furanone with phosphoryl chloride and dimethyl formamide. The following example illustrates the preparation of 3-cyano-5-dimethyl amino methylidene-4-phenyl 2(5H)-furanone:

30.6 g. (0.2 mole) of phosphoryl chloride was added to 200 ml. of dimethyl formamide with stirring while cooled with an ice bath. 37 g. (0.2 mole) of 3-cyano-4-phenyl 2(5H)-furanone was added to the solution thus obtained and the temperature rose to 46° C. in 15 minutes. The mass was stirred for 1 hour during which time a green solid separated. The mass was heated at 70–80° C. for an additional hour, cooled to room temperature and was then treated with 300 ml. of 10% aqueous NaOH. The solid product was collected on a filter, washed with water and dried, being a pale green solid melting at 219–222° C.

The following examples illustrate the preparation of dyes in accordance with the invention.

EXAMPLE I 37 grams (0.2 mole) of 3-cyano-4-phenyl 2(5H)-furanone and 30 grams (0.2 mole) of N,N-dimethyl-p-nitroso-aniline were dissolved in 400 ml. of dioxane. This solution was refluxed for 1 hour and was then allowed to cool overnight at room temperature. The solid which formed was filtered off and was recrystallized from 400 ml. of dioxane to give 32.7 grams (51.6 percent) of shiny green needles of 3-cycano-5-dimethyl-aminophenylimino-4-phenyl 2(5H)-furanone melting at 247–248° C. This material was found to be useful as a sensitizing dye for organic photoconductors in electrophotography.

EXAMPLE II 55.6 grams (0.2 mole) of p-N-ethyl-N-2-hydroxyethyl-aminoaniline sulfate was dissolved in 400 ml. of distilled water containing 68 ml. (0.8 mole) of concentrated hydrochloric acid. There was then added dropwise to this solution with mechanical stirring at 0–5°, a solution of 13.8 grams (0.2 mole) of sodium nitrite in 50 ml. of distilled water. The mass was stirred for 15 minutes after completion of the addition and then was added dropwise at 0–10° to a solution of 37 grams (0.2 mole) of 3-cyano-4-phenyl 2(5H)-furanone, 1 liter of tetrahydrofuran and 78.6 grams (1.3 mole) of aqueous 28% ammonia. After the addition had been completed, the mixture was stirred overnight and was then diluted with 1 liter of water. The solid which separated was filtered off and dried to give 31.6 grams of 4-cyano-3-phenyl-2,5 - dihydrofuran2,5-dione-2-p-N-ethyl-N-2-hydroxyethylaminophenylhydrazone, which melted at 183–184°. Repeated recrystallization from tetrahydrofuran-acetonitrile gave 13.3 grams (17.7 percent) of greenish-brown crystals melting at 195–196° C.

EXAMPLE III

Dissolved in 300 ml. of toluene were the following: 25 grams (0.168 mole) of p-dimethylaminobenzaldehyde, 31.0 grams (0.168 mole) of 3-cyano-4-phenyl 2(5H)-furanone, 0.5 ml. of piperidine and 0.5 ml. of glacial acetic acid. This solution was refluxed for 10 minutes during which time, 2.8 ml. of water was removed azeotropically. The mixture was cooled and the product was filtered, washed with benzene and dried giving 47.8 grams of shiny blue-gray crystals of 5-p-dimethylamino-benzal-3-cyano-4-phenyl 2(5H)-furanone. One recrystallization with filtration with 300 ml. of chlorobenzene gave 41.9 grams of the product melting at 235–237.5°. This material acted as a sensitizing dye for photoconductors in electrophotography.

EXAMPLE IV 37 grams (0.2 mole) of 3-cyano-4-phenyl-2(5H)-furanone was mixed with 14.8 grams (0.1 mole) of triethyl orthoformate and 250 ml. of pyridine. The resulting mass was refluxed with stirring for 1 hour, cooled in ice and the solid obtained was filtered off, washed with pyridine and then with ether and was dried at 60° C. to give 19.3 grams of green crystals of 5-[3-cyano-2-hydroxy - 4-phenyl-5-furylmethylidene]-3-cyano-4-phenyl-2(5H)-furanone, pyridine salt. Recrystallization from pyridine gave 15.1 grams of shiny green crystals of 5-[3 - cyano - 2 - hydroxy-4-phenyl-5-furylmethylidine]-3-cyano-4-phenyl-2(5H)-furanone, pyridine salt melting at 276–277° C.

EXAMPLE V 12 grams (0.05 mole) of 3-cyano-5-dimethylamino-methylidene-4-phenyl 2(5H)-furanone and 9.3 grams (0.05 mole) of 3-cyano-4-phenyl 2(5H) furanone were dissolved in 250 ml. of pyridine and the solution was stirred and refluxed for 2 hours. The mixture was then cooled in ice and tne solid which formed was filtered off and dried to five 13.8 grams of a solid material melting at 267° C. (dec.). The product was recrystallized from 100 ml. of pyridine giving 9.8 grams of green crystals of bis[3-cyano-4-phenyl-2 (5H)-furanone (5)] monomethineoxonol dimethylamine salt. This material acted as a sensitizing dye for organic photoconductors.

EXAMPLE VI

A mixture of 8.1 grams (0.025 mole) of 3,4-bis-p-nitrophenyl 2(5H)-furanone, 6 grams (0.025) of 3-cyano - 5 - di-methylaminomethylidene-4-phenyl 2(5H)-furanone, 50 ml. of pyridine, and 3 ml. of triethylamine was refluxed for 1 hour with mechanical stirring. The mass was held overnight at room temperature. The solid which formed was filtered off giving 5.2 grams (33 percent) of dark green crystals melting at 275–276° C. The product obtained was [3-cyano-4-phenyl-2(5H)-furanone (5)]—[3,4-di-p-nitrophenyl 2(5H)-furanone (5)] monomethineoxonol, triethylamine salt.

EXAMPLE VII 12 grams (0.05 mole) of 3-cyano-5-dimethylamino-methylidene-4-phenyl 2(5H)-furanone, 16.3 grams (0.05 mole) of cyclopentadienylidenetriphenylphosphorane and 1 ml. of glacial acetic acid was dissolved in 200 ml. of pyridine and the solution was refluxed with stirring for 1 hour. The mass was then diluted with 200 ml. of methanol and was cooled overnight by refrigeration. Filtration gave 19.7 grams of 2-[3-cyano-2,5-dihydro-2-oxo-4-phenyl-5 - furylidenemethyl]cyclopentadienylidene-triphenylphosphorane melting at 240–241° C. The product was recrystallized from 100 ml. of chlorobenzene giving 18 grams of dark red crystals. This product acts as a sensitizing dye for organic photoconductors.

EXAMPLE VIII

A mixture was prepared of 10 grams (0.0416 mole) of 3 - cyano-5-dimethylaminomethylidene-4-phenyl 2(5H)-furanone, 12.7 grams (0.0416 mole) of 3-ethyl-2-methylbenzothiazolium iodide, 200 ml. of methanol, and 1 ml. of piperidine. The mixture was refluxed with stirring for 4 hours. It was then cooled to room temperature and the solid which formed was filtered off, washed with methanol and dried to give 12.1 grams of 3-cyano-5-[3 - ethyl - 2-benzothiazolylideneethylidene]-4-phenyl 2-(5H)-furanone melting at 200–280° C. Recrystallization from 175 ml. of pyridine gave 8.9 grams (58 percent) of green crystals of a dye which acts as a sensitizer for organic photoconductors.

The effectiveness of the dyes of the invention as sensitizing addenda in organic photoconductor compositions was determined by comparing the relative speeds of unsensitized electrophotographic elements comprising known organic photoconductors with elements which were identical in all respects except that each of them contained a sensitizing amount of a representative dye in accordance with the invention. In every case the composition containing the sensitizing dye showed a substantial improvement in sensitivity.

The electrophotographic runs comparing these sensitizing dyes with products in which no sensitizing dye was present was carried out as follows:

A series of electrophotographic elements was prepared by coating on the surface of an aluminum foil (laminated to paper) at a wet thickness of 0.004 inch individual solutions prepared by dissolving in 5 ml. of tetrahydrofuran or dichloromethane 0.50 gram of polyester and a photoconductor selected from one of the following: (E) triphenylamine, (F) 1,3,5-triphenylpyrazoline, (G) 4,4'-bis(diethylamino)-2,2' - dimethyltriphenylmethane, (H) 2,3,4,5-tetraphenylpyrrole, and (K) 4,4'-bis (diethylamino)benzophenone. The resulting coatings were dried, dark conditioned for several hours and were charged in the dark by a positive corona to a surface potential of 600 volts. Relative speed values of the coatings were then determined and assigned on the basis of the reciprocal of the exposure required to reduce the initial surface potential by 100 volts as measured by an electrometer probe. The results obtained with each of the various organic photoconductors without sensitizing dye and with sensitizing dyes as indicated based on the following formula were as follows:

$$\begin{array}{c} O \\ O=C \diagup \diagdown C=D-W-Q \\ AC = CB \end{array}$$

| Photo-conductor | Sensitizer A | B | D | W | Q | Relative speed |
|---|---|---|---|---|---|---|
| E | | | | | | 20 |
| E | —CN | $C_6H_5$— | =N—NH— | | $C_6H_5$ | 30 |
| E | —CN | $C_6H_5$— | =CH—$C_6H_4$— | —CH= | =C(C_6H_5)—C(CN)=C—C=O (furanone w/ $C_6H_5$, CN) | 25 |
| E | —CN | $C_6H_5$— | =CH— | | 2,5-dihydroxyphenyl (HO—$C_6H_3$—OH) | 25 |
| E | —CN | $C_6H_5$— | =CH—CH=CH— | | $C_6H_5$— | 315 |
| F | | | | | | 62 |
| F | —CN | $C_6H_5$— | $=C(CH_3)$— | | $C_6H_5$— | 125 |
| F | p-$NO_2C_6H_4$— | $CH_3$— | =CH— | | $C_6H_5$— | 100 |
| F | —CN | $C_6H_5$— | =CH—CH=CH— | | $C_6H_5$— | 200 |
| G | | | | | | |
| G | —CN | $C_6H_5$— | =CH— | | $C_6H_5$— | 48 |
| G | —CN | $C_6H_5$— | =CH— | | $C_6H_4$—$N(CH_3)_2$ | 122 |
| G | —CN | $C_6H_5$— | =N—NH— | | $C_6H_5$— | 48 |
| G | —CN | $C_6H_5$— | =N— | | $C_6H_4$—$N(CH_3)_2$ | 25 |
| G | —CN | $C_6H_5$— | =CH—CH=CH— | | $C_6H_4$—$N(CH_3)_2$ | 48 |
| G | —CN | $C_6H_5$— | =CH— | | $C_6H_5$, CN, furanone-$O^\ominus$, $C_5H_5NH^\oplus$ | 48 |
| G | —CN | $C_6H_5$— | =CH— | —CH= | 1,3,3-trimethyl-2-indolinyl | 75 |
| G | —CN | $C_6H_5$— | =CH—CH—CH— | | $C_6H_5$, CH, furanone-$O^\ominus$, $(C_2H_5)_3NH^\oplus$ | 13 |
| G | —CH | $C_6H_5$— | =CH— | | 2,5-dihydroxyphenyl (HO—$C_6H_3$—OH) | 30 |
| G | p-$NO_2C_6H_4$— | p-$NO_2C_6H_4$— | =N— | | $C_6H_4$—$N(CH_3)_2$ | 40 |
| G | p-$NO_2C_6H_4$— | p-$NO_2C_6H_4$ | =CH— | | $C_6H_4$—$N(CH_3)_2$ | 200 |

| Photo-conductor | Sensitizer | | | | | Relative speed |
|---|---|---|---|---|---|---|
| | A | B | D | W | Q | |
| G | —CN | C₆H₅— | =CH—CH=CH— | | C₆H₅— | 200 |
| H | | | | | | 0 |
| H | —CN | C₆H₅— | =N—NH— | | C₆H₅— | 10 |
| H | —CN | C₆H₅— | =CH—CH=CH— | | C₆H₅— | 200 |
| K | | | | | | 40 |
| K | p-NO₂C₆H₄— | p-NO₂C₆H₄— | =N— | | —⟨C₆H₄⟩—N(CH₃)₂ | 79 |
| K | —CN | C₆H₅— | =C(CH₃)— | | C₆H₅— | 63 |

In addition to their utility as sensitizing dyes for organic photoconductors, the dyes of our invention dye textiles brilliant shades of color ranging from yellow to blue. Representative examples of these dyes and the hues they produce on various fabrics are included in the following table wherein A, B, D, W and Q have the same meaning as above.

| Dye Structure | | | | | Fabric | Hue |
|---|---|---|---|---|---|---|
| A | B | D | W | Q | | |
| —CN | C₆H₅— | =CH— | | C₆H₅, CN, furan with O⁻, C₆H₅NH⁺ | Acrylic | Royal Blue. |
| —CN | C₆H₅— | =CH— | —CH= | N-methyl-3,3-dimethylindoline | Polyester | Magenta. |
| —CN | C₆H₅— | =CH—CH=CH— | | C₆H₅, CN, furan with O, (C₂H₅)₃NH⁺ | Acrylic | Navy Blue. |
| —CN | C₆H₅— | =C(—C₆H₄—N(CH₃)₂)— | | —⟨C₆H₄⟩—N(CH₃)₂ | Polyester | Red. |
| —CN | C₆H₅— | =CH—CH=CH— | | C₆H₅— | do | Yellow. |
| —CN | C₆H₅— | =C(CH₃)— | | C₆H₅— | do | Orange. |
| p-NO₂—C₆H₄— | p-NO₂—C₆H₄— | =CH— | | —⟨C₆H₄⟩—N(CH₃)₂ | do | Red. |
| —CN | C₆H₅— | =CH— | | julolidine | do | Red. |
| —C(=O)O—CH₂—CH(C₂H₅)—(CH₂)₃—CH₃, NH—C(=O)— | C₆H₅— | =CH—⟨C₆H₄⟩— | | —CH=C(O)—C₆H₅—C(=O)—NH—C(=O)O—CH₂—CH(C₆H₅)—(CH₂)₃—CH₃ | do | Yellow. |

| Dye Structure | | | | | Fabric | Hue |
|---|---|---|---|---|---|---|
| A | B | D | W | Q | | |
| —CN | $C_6H_5$— | =CH— |  | 4-(N($C_2H_5$)(($CH_2$)$_2$N($CH_3$)$_2$))-3-methylphenyl group | ....do.... | Red. |
| —CN | $C_6H_5$— | =CH— | —CH= | =C< (N-ethylbenzothiazolylidene) | ....do.... | Magenta. |

EXAMPLE IX

The intermediate 3,4-diphenyl 2(5H)-furanone was made by reacting tolane with ethanol and carbon monoxide in the presence of palladium chloride and HCl by the method described in an article by Tsugi and Nogi, J.A.C.S. 88, 1289 (1961).

This intermediate was reacted with p-dimethylaminobenzaldehyde by the method described in Example III supra. There was obtained 5-p-dimethylaminobenzylidene-2,4-diphenyl 2(5H)-furanone, an orange dye melting at 246–249° C.

The invention has been described in considerable detail with particular reference to certain preferred embodiments thereof, but it will be understood that variations and modifications can be effected within the spirit and scope of the invention as described hereinabove and as defined in the appended claims.

We claim:

1. An electrophotographic element comprising an organic photoconductor and from 0.5–5% by weight of the photoconductor of a sensitizing dye having the general formula

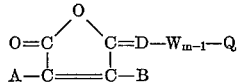

wherein A represents —CN or p-nitrophenyl, B is an alkyl group or an aryl radical, D represents CH—;

CH(—CH=CH)$_n$

a nitrogen atom, a hydrazinylylidene radical or an aralkylidene radical, W represents =CH—, Q represents an aryl radical, a heterocyclic radical or a heterocyclidene radical, $m$ represents 1 or 2 and $n$ represents 1 or 2.

2. An electrophotographic element in accordance with claim 9 in which the sensitizing dye is 3-cyano-5-p-dimethylaminobenzylidene-4-phenyl 2(5H)-furanone.

3. An electrophotographic element in accordance with claim 9 in which the sensitizing dye has the following structural formula:

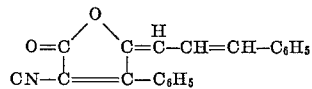

4. An electrophotographic element in accordance with claim 9 in which the sensitizing dye is 5-p-dimethylaminobenzylidene-3,4-di-p-nitrophenyl-2(5H)-furanone.

5. An electrophotographic element in accordance with claim 9 in which the sensitizing dye is 5-p-dimethylaminophenylimino-3,4-di-p-nitrophenyl-2(5H)-furanone.

6. An electrophotographic element in accordance with claim 9 in which the sensitizing dye is 3-cyano-5-(α-methylbenzylidene)4-phenyl-2(5H)-furanone.

References Cited

UNITED STATES PATENTS

| 3,113,939 | 12/1963 | Martin | 260—240 |
| 3,140,946 | 7/1964 | Cassiers et al. | 96—1 |
| 3,163,530 | 12/1964 | Schlesinger | 96—1 |
| 3,403,019 | 9/1968 | Stahly et al. | 96—1.5 |

GEORGE F. LESMES, Primary Examiner

J. C. COOPER III, Assistant Examiner

U.S. Cl. X.R.

96—1.7; 260—346.1, 343.6; 8—55